US008090263B2

(12) United States Patent
Mussatt et al.

(10) Patent No.: US 8,090,263 B2
(45) Date of Patent: Jan. 3, 2012

(54) SYSTEM AND METHOD FOR EXPANDING PCIE COMPLIANT SIGNALS OVER A FIBER OPTIC MEDIUM WITH NO LATENCY

(75) Inventors: Kip Mussatt, San Diego, CA (US); Marius Stefanescu, San Diego, CA (US)

(73) Assignee: Mission Technology Group Inc.

( * ) Notice: Subject to any disclaimer, the term of this patent is extended or adjusted under 35 U.S.C. 154(b) by 956 days.

(21) Appl. No.: 11/895,376

(22) Filed: Aug. 24, 2007

(65) Prior Publication Data
US 2009/0052903 A1   Feb. 26, 2009

(51) Int. Cl.
*H04B 10/00* (2006.01)
(52) U.S. Cl. ........................................ 398/116; 398/136
(58) Field of Classification Search .......... 398/115–118, 398/135–139
See application file for complete search history.

(56) References Cited

U.S. PATENT DOCUMENTS

| | | | |
|---|---|---|---|
| 6,002,996 A * | 12/1999 | Burks et al. | 702/188 |
| 6,721,838 B1 | 4/2004 | Lim | |
| 7,133,617 B2 * | 11/2006 | Oettinger et al. | 398/123 |
| 7,395,366 B1 * | 7/2008 | Wright | 710/315 |
| 2005/0286906 A1 * | 12/2005 | Togami et al. | 398/164 |
| 2006/0200600 A1 * | 9/2006 | Groso | 710/62 |
| 2006/0285803 A1 * | 12/2006 | Crews | 385/88 |
| 2009/0028575 A1 * | 1/2009 | Epitaux et al. | 398/139 |

FOREIGN PATENT DOCUMENTS
KR    2004057142    *   7/2004
* cited by examiner

*Primary Examiner* — Leslie Pascal
(74) *Attorney, Agent, or Firm* — Robert C. Klinger

(57) ABSTRACT

A system for expanding PCI Express (PCIe) compliant signals over a fiber optic medium with no latency. A standardized fiber optic transceiver is adapted to provide an optimal PCIe expansion over a fiber optic medium. Signal buffers are utilized to translate and fine-tune standardized PCIe traffic to a level of low voltage differential signaling (LVDS) that is comprehensible to a wide range of fiber optic transceivers over a wide range of interface bandwidths. The intended use for such a high-speed LVDS buffer is to strengthen and enable PCIe signals over metal (copper) cable or metal printed circuit board (PCB) traces for large PCBs, such as backplanes, server motherboards, etc. By disposing the PCIe buffer used for metal (copper) cable between the PCIe bus and the fiber optic transceiver, one can achieve the signal conditioning and translating required to allow PCIe signals to pass over the fiber optic medium.

18 Claims, 3 Drawing Sheets

SYSTEM AND METHOD FOR EXPANDING PCIE COMPLIANT SIGNALS OVER A FIBER OPTIC MEDIUM WITH NO LATENCY

FIELD OF THE INVENTION

The present invention is generally related to PCI Express (PCIe) compliant signals, and more specifically to transmission of PCIe compliant signals over a fiber optic medium.

BACKGROUND OF THE INVENTION

A high-speed LVDS signal over copper (either cable or traces) has a distance length limitation, which varies with the cable type and quality, for correctly transmitting and receiving PCIe signals. Two methods exist for increasing this distance. The first is to use a higher quality cable, but this method still has an upper limit because of resistance in the copper wires, inherent inductance, and other physical properties of the copper/metal medium over which the signals are being sent. The second method is to use a PCIe buffer periodically in the path of the signal. This buffer can be placed at either end, both, or in the middle of the path. Again, once the path has reached a critical length, another buffer must be used. The downfall to this method is the high cost and the required physical placement of this buffer periodically in the path.

For a (copper) cabled solution such as what Magma, Inc. of San Diego, Calif., designs and sells, it is not feasible to put buffers in the middle of a cable. This would introduce many EMI/EMC and signal integrity problems as well as increased cost.

Two examples of prior art to increase distance are to install a PCIe to giga-bit ethernet card (for a copper interface) or a fiber optic channel card (for an optical interface) on both ends. In each case the giga-bit ethernet or fiber optic channel use an overlay protocol. The overlay protocol has many drawbacks, most importantly, is the overhead latency associated with the addition of a protocol. Because of this latency, one cannot expect full PCIe throughput using this art or method. Thus, currently there is a limit in meters which is achievable using a design methodology that does not add latency.

SUMMARY OF INVENTION

The present invention achieves technical advantages as a system for expanding PCI Express (PCIe) compliant signals over a fiber optic medium with no latency. One embodiment of the invention utilizes a standardized fiber optic transceiver adapted to provide optimal PCIe expansion over this medium. The core of the invention involves the application of signal buffers to translate and fine-tune standardized PCIe traffic to a level of low voltage differential signaling (LVDS) that is comprehensible to a wide range of fiber optic transceivers over a wide range of interface bandwidths. The above invention describes a robust, scalable and economically advantageous method of interfacing PCIe traffic.

This methodology is unique because the intended use for such a high-speed LVDS buffer is to strengthen and enable PCIe signals over metal (copper) cable or metal printed circuit board (PCB) traces for large PCBs, such as backplanes, server motherboards, etc. By using the same PCIe buffer used for metal (copper) cable as a Physical (PHY) Layer Translator between the PCIe bus and the fiber optic Transceiver, one may achieve the signal conditioning and translating required to allow PCIe signals to pass over fiber optic medium using a wide variety of industry standard fiber optic Modules, as driven from a wide variety of PCIe chipsets.

TERMINOLOGY

Figure 1:
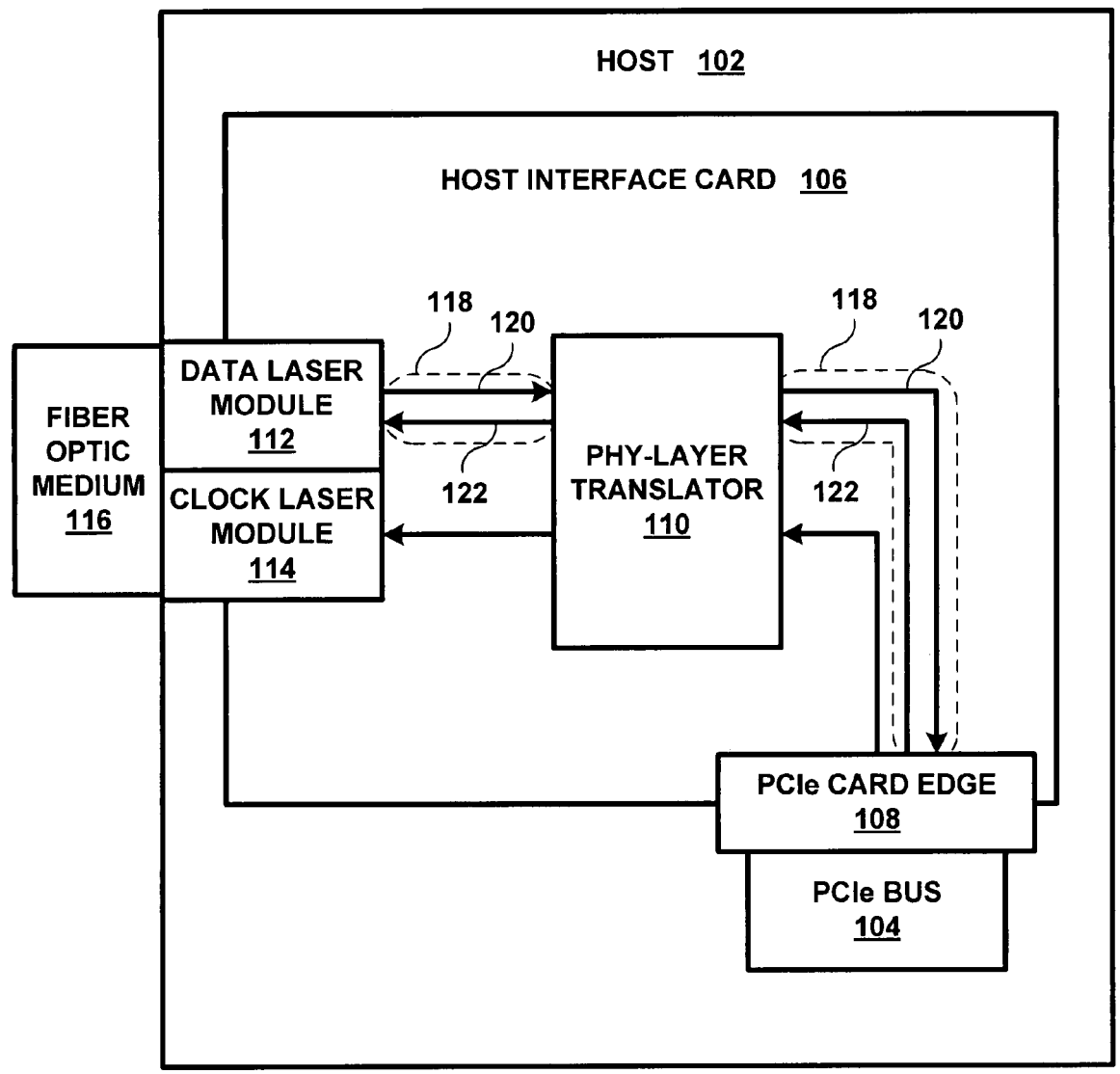
FIG. 1 is a diagram of a system for propagating a PCIe compliant signal over a fiber optic medium from a host system in accordance with an exemplary embodiment of the present invention.

In order to more clearly understand the present invention, the following terminology is provided, and should be referred to as needed:

A Peripheral card shall refer to a PCIe card that plugs into a bus. Examples include, but are not limited to: SCSI controller, video cards, sound cards, USB cards, etc.

A Host unit shall refer to a computer system whose PCIe bus we wish to expand by offering additional PCIe slots.

A Host interface card shall refer to the specific peripheral card that plugs into the said host unit with the sole purpose of creating an expansion interface to the expansion unit.

An Expansion interface card shall refer to a specialized card located inside the expansion unit (described below), whose purpose is to interface between the said host interface card and the expansion unit.

An Expansion unit shall refer to any device that extends or expands a bus outside of its normal physical environment. An expansion unit is intended for normal use of a peripheral card(s). Magma makes several PCI expansion units that fall into this category.

A Bridging device (IC) shall refer to chip which interfaces signals from one bus to another. Examples of a bridge chip include, but are not limited to: 41210 (Intel), PEX8111 (PLX), XIO2000 (TI).

A Switching device (IC) is a type of bridging device from a software standpoint. Though distinct hardware-wise, it behaves like a bridging device for backward compatibility with existing software. Examples of this are the uPD720401 (NEC), PEX8508 (PLX), XIO3130 (TI).

DETAILED DESCRIPTION OF THE PRESENT INVENTION

The present invention utilizes a 2.5 Gbps x2 Lane Serial PCIe repeater/equalizer IC, part number P12EQX4402, manufactured by Pericom Semiconductor of San Jose, Calif. The repeater/equalizer IC was designed to propagate signals across backplanes and extend copper on a circuit board. The repeater/equalizer IC was not designed to interface fiber optic transceivers, or rather prepare a signal to be converted from electronic data into light data. This chip is one of many such chips that do this; herein use of this chip in this method as a "PHY-layer translator."

There are two general categories of PCIe compliant signals, there are high speed signals—which contain both clock and data, and there are low speed signals—such as a reset signal. Low speed signals are either there, or not there, much like direct current (DC) signals. The high speed signals are directed toward a high speed converter. The low speed signals are directed toward a low speed converter. In one exemplary embodiment, the low speed converter is a transistor amplifier. The low speed signal is then transmitted out of reset.

The present invention manages a plurality of signals, such as clock, transmit data, and receive data, which are all differential signals. The differential signals propagate toward a PHY-layer translator implementation which adjusts signal levels and drive strength. After which, those signals are propagated to the fiber optic module that converts the signals from electrons to light photons. Advantageously, because there is no signal loss, signal jitter is greatly mitigated.

Referring to FIG. 1, there is shown at 100 a diagram of a system for propagating a PCIe compliant signal over a fiber optic medium in accordance with an exemplary embodiment of the present invention. System 100 is comprised of host 102, PCIe bus 104, host interface card 106, PCIe card edge 108, PHY-layer translator 110, data laser module 112, and clock laser module 114, and fiber optic medium 116.

Host interface card 106 is operably coupled to host 102 by PCIe card edge 108. PCIe compliant signals are propagated between host 102 and host interface card 106 via PCIe card edge 108. In one exemplary embodiment, host 102 is any electrical device containing a PCIe bus. PCIe card edge 108 allows communication between host 102 and host interface card 106 using three signals: PER 120, PET 122, and REFCLK 124. PER 120 and PET 122 comprise PCIe lane 118.

PER 120, PET 122, and REFCLK 124 are propagated toward PHY-layer translator 110, for further modification. Once modified, PER 120 and PET 122 are propagated toward data laser module 112, and clock 124 is propagated toward clock laser module 114. Data laser module 112 and clock laser module 114 convert their respective electronic signals into photonic (light) signals. In a alternate embodiment system 100 can transmit PCIe compliant signals over fiber optic medium 116 without the use of clock laser module 114, thereby reducing the cost of system 100. These light signals are then transmitted over fiber optic medium 116 to an expansion with the same interface, in order to receive the PCIe compliant signal and propagate it along its PCIe bus.

Figure 2:
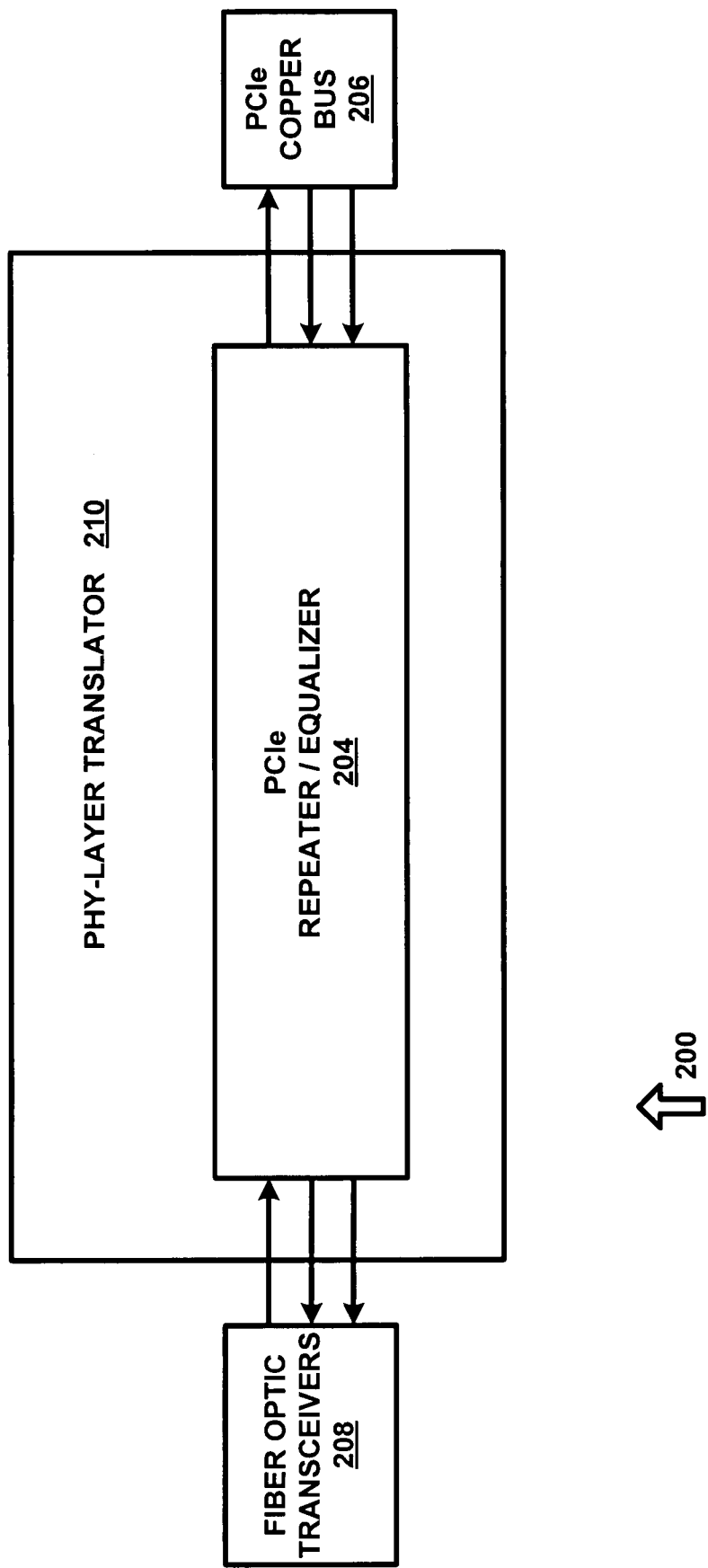
FIG. 2 is a diagram of a method for adapting a fiber optic transceiver to transmit PCIe compliant signals in accordance with an exemplary embodiment of the present invention.

Referring to FIG. 2, there is shown at 200 a diagram of a PHY-layer Translator adapted to propagate a PCIe compliant signal over a fiber optic medium in accordance with an exemplary embodiment of the present invention. System 200 is comprised of PHY-layer translator 210, fiber optic transceivers 208, and PCIe copper bus 206.

When transmitting the PCIe compliant signal over fiber optic medium, PHY-layer translator 210 receives a low voltage differential signal (LVDS) from PCIe copper bus 206, and modifies the signal in order to supply fiber optic transceivers 208 with electrical signals appropriate for conversion into light signals.

Figure 3:
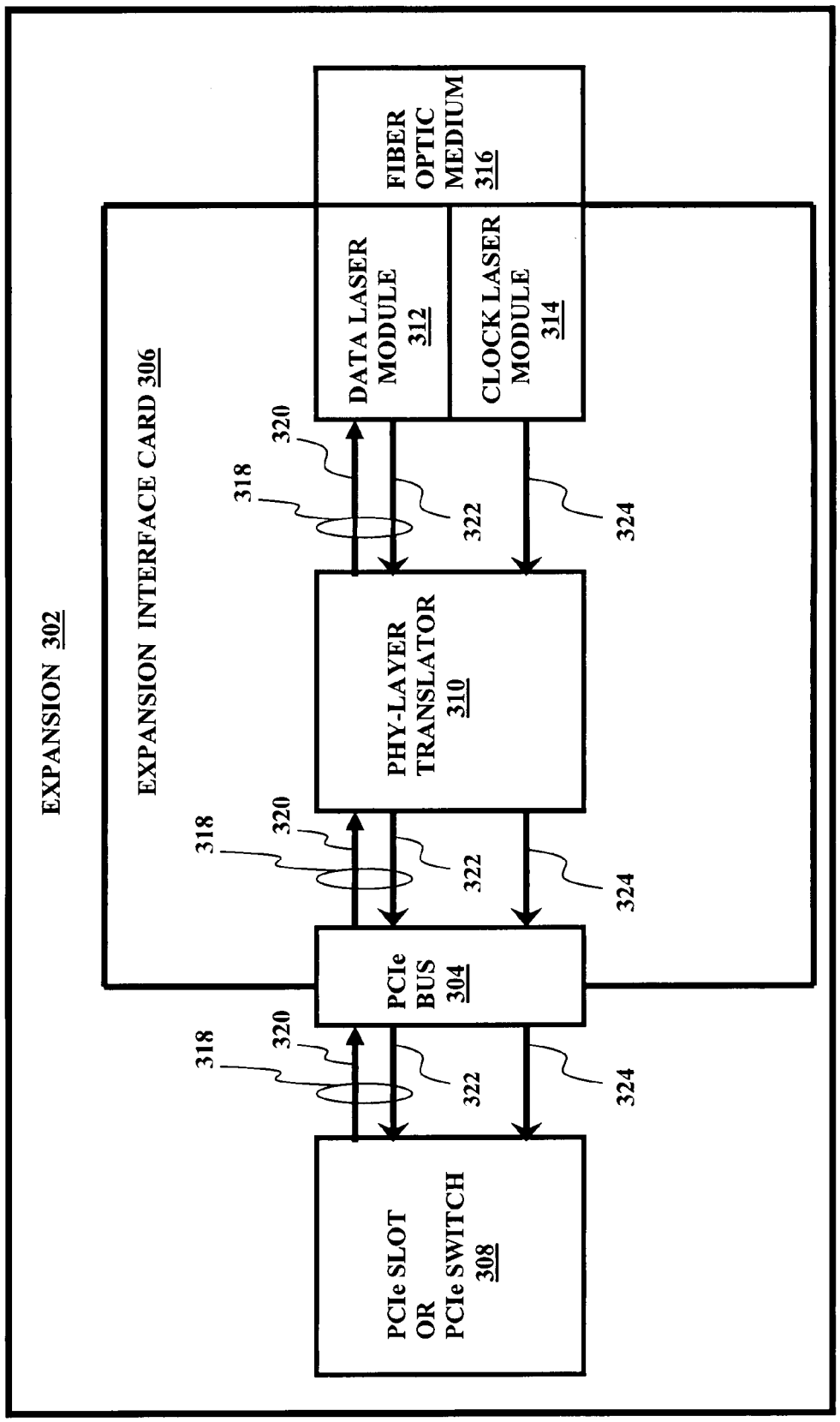
FIG. 3 is a diagram of a system for propagating a PCIe compliant signal over a fiber optic medium from an expansion system in accordance with an exemplary embodiment of the present invention.

When receiving the PCIe compliant signal over fiber optic medium, fiber optic transceivers 208 receive light signals and convert them into electronic signals shown in FIG. 3. The optic signal is propagated to PHY-layer translator 210, which modifies the electronic signal to supply a PCIe compliant signal that is propagated over PCIe copper bus 206. Thus, the next transaction on the PCIe bus will comprise expected signals with expected levels.

Typically, the PCIe signal is not sufficient to drive fiber optic transceivers 208. Therefore, PHY-layer translator 210 amplifies the PCIe signal in order to ensure proper signal levels. In a first exemplary embodiment, the signal to be propagated over the fiber optic medium is an Infiniband compliant signal.

In terms of latency and phase shift, the signal is not affected in any way, because PHY-layer translator 210 propagates either an attenuated or amplified version of the signal. The dynamic range is such that no data is lost during the level conversion, propagation, and subsequent re-leveling of the signal to its original levels. Although PCIe bus does have a protocol, the details of the protocol are irrelevant to the PHY-layer translator 210 does not modify this encoding.

Referring to FIG. 3, there is shown at 300 a diagram of a system for propagating a PCIe compliant signal over a fiber optic medium in accordance with an exemplary embodiment of the present invention. System 300 is comprised of an expansion 302, PCIe bus 304, expansion interface card 306, PCIe bus 304 onto PCIe slot or switch 308, PHY-layer translator 310, data laser module 312, and clock laser module 314, and fiber optic medium 316.

Expansion interface card 306 is operably coupled to expansion 302 by PCIe card edge 308. PCIe compliant signals are propagated between expansion 302 and expansion interface card 306 via PCIe card edge 308. In one exemplary embodiment, expansion 302 is any electrical device containing a PCIe bus. PCIe card edge 308 allows communication between expansion 302 and expansion interface card 306 using three signals: PER 320, PET 322, and REFCLK 324. PER 320 and PET 322 comprise PCIe lane 318.

PER 320, PET 322, and REFCLK 324 are propagated toward PHY-layer translator 310 for further modification. Once modified, PER 320 and PET 322 are propagated toward data laser module 312, and REFCLK 324 is propagated from clock laser module 314. Data laser module 312 and clock laser module 314 convert their respective photonic (light) signals into electric signals. These light signals are then transmitted over fiber optic medium 316 to a host in order to receive the PCIe compliant signal and propagate it along its PCIe bus.

Advantageously, instead of allowing a signal to propagate one meter or four meters, as with copper solutions, the distance a light signal can be propagated is limited only by the fiber optic medium. Currently a tested configuration of the above expansion technology performed well up to 300 meters using standard 2.5 GBps, commonly available, SFP fiber optic transceivers. Therefore as technology improves it will be possible to achieve an even greater distance.

The present invention achieves further technical advantages by avoiding the addition of overhead to the received signal by enveloping the received signal in a second protocol. There is no latency in the data transfer because the system does not have to read in all the data, store it in a buffer, and then send it. This is an advantage over prior designs that utilize such a method. The system also amplifies or attenuates the PCIe compliant signal as needed. Moreover, a single lane of PCIe is propagated to a single lane of PCIe.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

What is claimed is:

1. A system for transmitting and receiving a PCIe compliant signal over a fiber optic medium, comprising:
   a PCIe card edge configured to receive an electronic PCIe compliant signal from a PCIe bus;
   a PHY-layer translator configured to receive the electronic PCIe compliant signal from the PCIe card edge and condition the electronic PCIe compliant signal; and a fiber optic laser module configured to receive the conditioned electronic PCIe compliant signal and convert the conditioned electronic PCIe compliant signal into a photonic PCIe compliant signal.

2. The system of claim 1, further comprising a fiber optic medium configured to carry the photonic PCIe compliant signal to a remote fiber optic laser module.

3. The system of claim 1, wherein the fiber optic laser module contains a data fiber optic laser module, and a clock fiber optic laser module.

4. The system of claim 1, wherein the electronic PCIe compliant signal is a low voltage differential signal (LVDS).

5. The system as specified in claim 1 wherein the PHY-layer translator is configured to condition the electronic PCIe compliant signal without introducing latency.

6. The system as specified in claim 1 wherein the PHY-layer translator is configured to condition the electronic PCIe compliant signal and mitigate jitter.

7. The system as specified in claim 1 wherein the PHY-layer translator is comprised of an equalizer configured to balance and condition the electronic PCIe complaint signal.

8. The system as specified in claim 7 wherein the equalizer is configured to both attenuate and amplify the electronic PCIe compliant signal.

9. The system of claim 1 wherein the PHY-layer translator is configured to condition the electronic PCIe compliant signal in the time-domain.

10. A system for receiving a PCIe compliant signal over a fiber optic medium, comprising:
    a fiber optic laser module configured to receive a photonic PCIe compliant signal and convert the photonic PCIe compliant signal into an electronic signal;
    a PHY-layer translator configured to receive the electronic signal from the fiber optic laser module, and condition the electronic signal, thereby creating a conditioned electronic PCIe compliant signal; and
    a PCIe card edge configured to receive the conditioned electronic PCIe compliant signal and propagate the conditioned electronic PCIe compliant signal on a PCIe bus.

11. The system of claim 10, wherein the fiber optic laser module is configured to modify PCIe signals including data (PET/PER) and clock (REFCLK).

12. The system as specified in claim 10 wherein the PHY-layer translator is configured to condition the electronic PCIe compliant signal without buffering and storing the electronic PCIe compliant signal.

13. The system as specified in claim 10 wherein the PHY-layer translator is configured to condition the electronic PCIe compliant signal without introducing latency.

14. The system as specified in claim 10 wherein the PHY-layer translator is configured to condition the electronic PCIe compliant signal and mitigate jitter.

15. The system as specified in claim 10 wherein the PHY-layer translator is comprised of an equalizer configured to equalize the electronic PCIe complaint signal.

16. The system as specified in claim 15 wherein the equalizer is configured to both attenuate and amplify the electronic PCIe compliant signal.

17. The system as specified in claim 10 wherein the PHY-layer translator is configured to condition the electronic PCIe compliant signal without buffering and storing the electronic PCIe compliant signal.

18. The system of claim 10 wherein the PHY-layer translator is configured to condition the electronic PCIe compliant signal in the time-domain.

* * * * *